United States Patent
Teramachi

(10) Patent No.: US 6,398,417 B1
(45) Date of Patent: Jun. 4, 2002

(54) ROLLING MEMBER

(75) Inventor: Hiroshi Teramachi, 3-12-30-301, Kamiosaki, Shinagawa-ku, Tokyo (JP)

(73) Assignee: Hiroshi Teramachi, Tokyo (JP)

( * ) Notice: Subject to any disclaimer, the term of this patent is extended or adjusted under 35 U.S.C. 154(b) by 0 days.

(21) Appl. No.: 09/490,604

(22) Filed: Jan. 25, 2000

(30) Foreign Application Priority Data

Nov. 16, 1999 (JP) ............................................. 11-363197

(51) Int. Cl.[7] ............................ F16C 33/32; F16C 33/34
(52) U.S. Cl. ........................ 384/491; 384/568; 384/371; 384/44
(58) Field of Search ................................. 384/568, 491, 384/494, 548, 571, 56, 44; 464/139–142

(56) References Cited

U.S. PATENT DOCUMENTS

| | | | | |
|---|---|---|---|---|
| 3,740,108 A | * | 6/1973 | Fernlund | 384/568 X |
| 3,827,771 A | * | 8/1974 | Fernlund | 384/568 X |
| 3,829,183 A | * | 8/1974 | Hingley | 384/565 |
| 4,547,023 A | * | 10/1985 | Blatter | 384/44 |
| 4,802,775 A | * | 2/1989 | Takata | 384/568 X |
| 4,929,098 A | | 5/1990 | Takata et al. | 384/450 |
| 5,752,775 A | * | 5/1998 | Tsutsui et al. | 384/568 |

FOREIGN PATENT DOCUMENTS

| | | |
|---|---|---|
| DE | 2161287 | 6/1973 |
| EP | 100467 | 2/1984 |
| FR | 425081 | 6/1911 |
| FR | 545806 | 10/1922 |
| JP | 35-6253 | 6/1960 |
| JP | 35-30914 UM | 11/1960 |
| JP | 47-11861 | 6/1972 |
| JP | 47-19642 UM | 11/1972 |
| JP | 49-33634 UM | 9/1974 |
| JP | JP-14020 UM | 1/1988 |
| JP | 63-14019 UM | 1/1988 |
| JP | 63-14021 UM | 1/1988 |
| JP | 11-201162 | 7/1999 |

* cited by examiner

*Primary Examiner*—Thomas R. Hannon
(74) *Attorney, Agent, or Firm*—Brinks Hofer Gilson & Lione

(57) ABSTRACT

A rolling member is utilized for such as a rolling bearing and the rolling members are disposed to be rollable between members which are relatively movable with respect to each other. The rolling member is provided with a rolling portion contacting the movable members during the rolling motion thereof and longitudinal both end portions. The rolling portion is formed to provide a protruded circular arc shape and the end portions are formed so as to provide a spherical shape, the circular rolling portion has a radius of curvature larger than a radius of each of the end spherical portions, and a distance between the end spherical portions is larger than a maximum diameter of the circular rolling portion.

5 Claims, 5 Drawing Sheets

PRIOR ART

ROLLING MEMBER

BACKGROUND OF THE INVENTION

The present invention relates to a rolling member which is disposed to be rollable or rotatable between members, which are relatively movable to each other, of a rolling bearing, a linear motion guide apparatus, a uniform motion joint or the like.

More specifically, the present invention relates to a rolling member particularly applicable to a rolling bearing having high performance, the rolling member having a line contact structure in place of a point contact structure in a conventional ball bearing, having an effective contact length which is made about $2/3$ of a roller while maintaining an easily usable characteristic of the ball bearing and, in addition, having, as like as a roller bearing, four times of load carrying capacity and sixty-four times of usable life time, thereby providing high rigidity, high load carrying capacity and eliminating difficulty in use.

Further, it is to be noted that the ball mentioned herein has a substantially true circular section when cut in any direction and the roller mentioned herein has a cylindrical body having a substantially uniform circular cross section cut in its longitudinal direction.

In a conventional art, balls or rollers are used as rolling members for such rolling bearings.

The ball, in the ball bearing, takes a point-contact structure and, hence, a load capacity is small, but the ball bearing is easily usable and handled. On the other hand, the roller, in the roller bearing, takes a line-contact structure, and hence, has about six times of load (carrying) capacity with respect to the ball bearing. Thus, the roller bearing has high rigidity and high load capacity, but it is necessary to work an object member with high performance and to be assembled with the object member also with high accuracy, thus being not easily usable and being expensive in comparison with the ball bearing.

SUMMARY OF THE INVENTION

The present invention was conceived in view of the above circumstances in the prior art and to provide a rolling member capable of being easily usable as like as ball bearing and having high load carrying capacity as like as roller bearing.

This and other objects can be achieved according to the present invention by providing a rolling member which is disposed to be rollable between members which are relatively movable with respect to each other and which is provided with a rolling portion contacting an object member during the rolling motion thereof and longitudinal both end portions, wherein the rolling portion is formed to provide a protruded circular arc shape and the end portions are formed so as to provide spherical shape, the circular rolling portion having a radius of curvature larger than a radius of each of the end spherical portions and a distance between the end spherical portions being larger than a maximum diameter of the circular rolling portion.

In a preferred embodiment of the present invention, supposing that the maximum diameter of the circular rolling portion is defined as a short diameter and a length (distance) between the end spherical portions is defined as a long diameter, the length of the short diameter is within a range of 80±15% of the length of the long diameter.

The circular rolling portion has a large diameter side on one side end spherical portion and a short diameter side on another one side end spherical portion so that the circular shape of the circular rolling portion provides a tapered surface shape in a longitudinal direction of the rolling member.

The circular rolling portion and the end spherical portions are formed to be continuous to each other and this continuous portion between the circular rolling portion and the end spherical portion is formed so as to provide a smooth round shape.

The circular rolling portion is formed by deforming a portion of a material ball and the end spherical portions are opposing two spherical portions of the material ball which are not subjected to the deforming working.

According to the rolling member of the present invention having the structure mentioned above, the contact length of the circular rolling portion is made longer than that of the ball used as rolling member, so that the load (carrying) capacity can be hence made large several times in comparison with the case of the ball, and accordingly, high load capacity and high rigidity nearly that of the roller as rolling member can be realized. Furthermore, the difference in diameter between a central portion of the circular rolling portion and an end portion thereof is smaller than the difference in diameter there between in the case of the ball, so that the differential sliding motion is reduced and the friction resistance can be hence reduced.

Further, the rolling member of the present invention can be smoothly moved in comparison with the case of the ball and less heat generation is caused during the rolling motion.

Still furthermore, since the rolling member can be manufactured from a material ball, the homogeneous structure can be achieved with reduced manufacturing cost in comparison with the case of the roller.

Still furthermore, in the case of the roller, in a case where the track surface is inclined in the roller axial direction, one side of the roller abuts against the object member (for example, rolling member rolling groove), and hence, relatively high dimensional precision is required for the working or assembling of the object member such as track wheel. However, according to the present invention, the rolling portion is formed so as to provide a circular rolling shape, so that the inclination of the track surface of the object member can be considerably allowed as like as the ball. Therefore, it is not required for the object member to have high working or assembling precision.

The nature and further characteristic features of the present invention will be made more clear from the following descriptions made with reference to the accompanying drawings.

DESCRIPTION OF THE PREFERRED EMBODIMENTS

Preferred embodiments of the present invention will be described hereunder more in detail with reference to the accompanying drawings.

Figure 1:
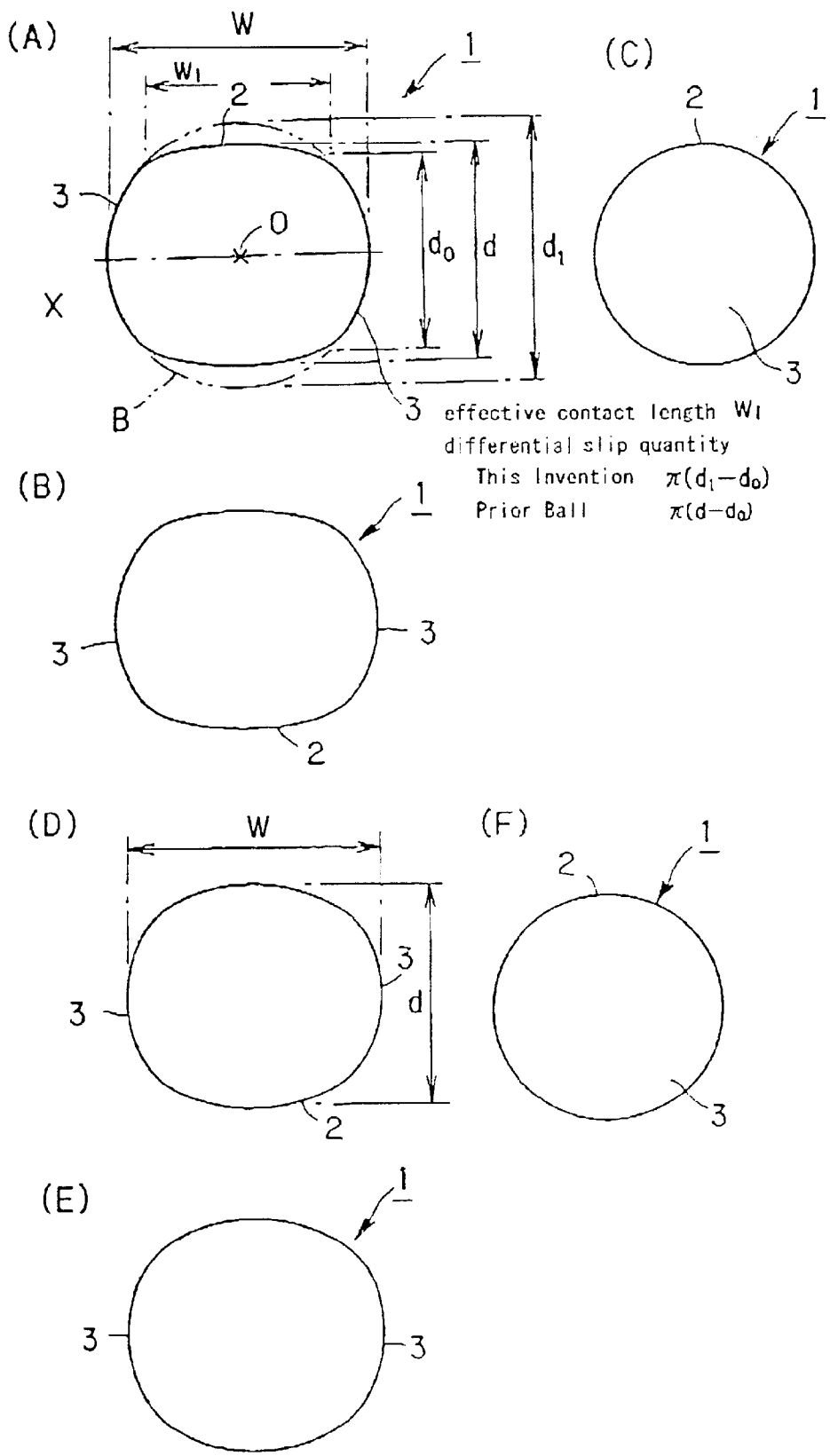
FIG. 1 illustrates a rolling member according to a preferred embodiment of the present invention and includes FIGS. 1A, 1B and 1C being front view, plan view and side view of the rolling member in which a short diameter of the rolling member has a length of about 80% of a length of a large diameter thereof and FIGS. 1D, 1E and 1F being front view, plan view and side view of the rolling member in which a short diameter of the rolling member has a length of about 90% of a length of a large diameter thereof.

First, with reference to FIG. 1, a rolling member 1 has a rolling spherical portions 2,2 which are protruded outward so as to provide circular arc shapes and end spherical portions 3,3 which are protruded in a spherical shape at both end portions of the circular rolling portions 2,2. A length W between the end spherical portions 3,3 is longer than a maximum diameter d of the circular rolling portion 2.

Centers of both the bilateral end spherical portions 3,3 are substantially equal to each other and positioned on one imaginary spherical surface B, and the circular rolling portions 2,2 each provides a circular arc shape having a radius larger than a radius of curvature of the end spherical portion 3. These circular arc portions are positioned inside the imaginary spherical surface B.

The circular rolling portions 2,2 have the same diameter at both bilateral end portions thereof and have bilaterally symmetric circular arc shapes with respect to an axis passing the center O which is normal to the central axis X. The outer appearance of the rolling member 1 has a shape formed in combination of the arcuate shape of the circular rolling portions 2,2 and the spherical shape of the end spherical portions 3,3. The longitudinal section of the rolling member 1 has substantially an intermediate shape between an elliptical shape and a circular shape, and boundary (continuous) portions therebetween are formed so as to provide round shapes.

Supposing that the maximum diameter d of the circular rolling portion 2 of the rolling member 1 is referred to as a short diameter and a length W between both the end spherical portions 3,3 (i.e. a distance between apexes of the end spherical portions) is referred to as a long diameter, it is preferred to define the short diameter d in a range of 8±15% with respect to the long diameter W. Further, FIGS. 1A to 1C represent examples of the rolling member having the above ratio of 80% and FIGS. 1D to 1F represent examples thereof having the above ratio of 90%. That is, as the ratio becomes a small value (difference between the diameters d and W becomes small), the shape of the rolling member 1 approaches a sphere, and on the other hand, as the ratio becomes a large value (difference between the diameters d and W becomes large), the shape thereof approaches a roller shape. In the latter case, the rolling member provides a high load capacity and is suitable for a heavy load.

Figure 2:
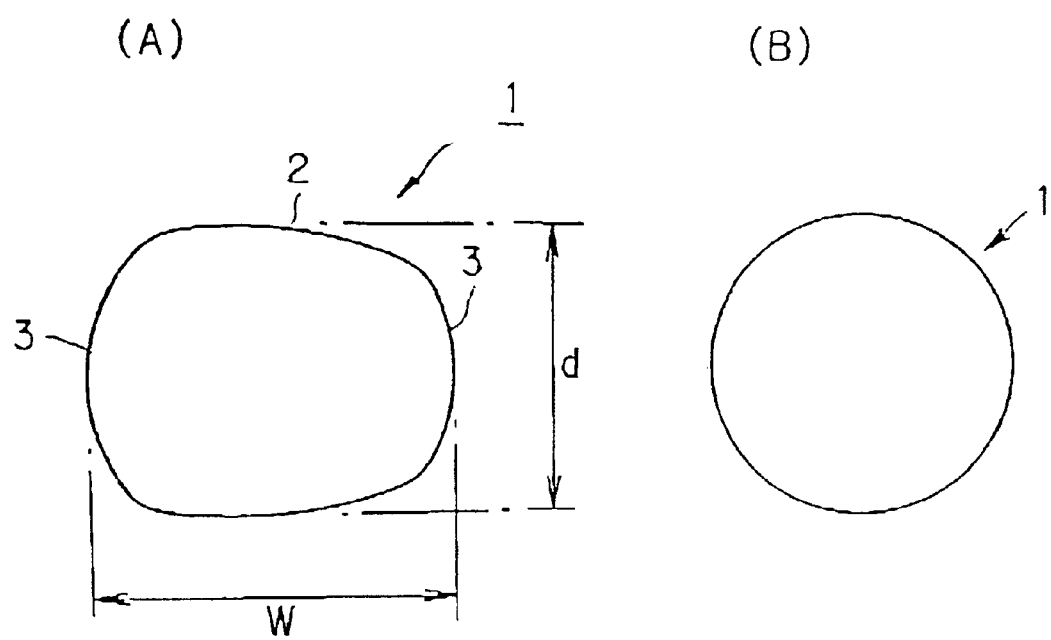
FIG. 2 illustrates a rolling member according to the present invention having a rolling spherical surface in a tapered shape and includes FIG. 2A being a front view thereof and FIG. 2B being a side view thereof.
Figure 4:
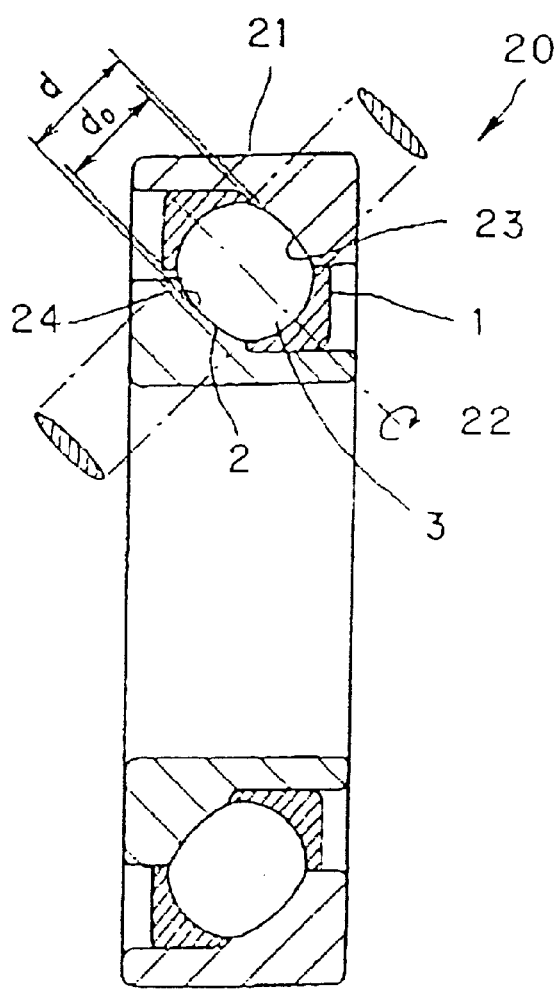
Figure 4:
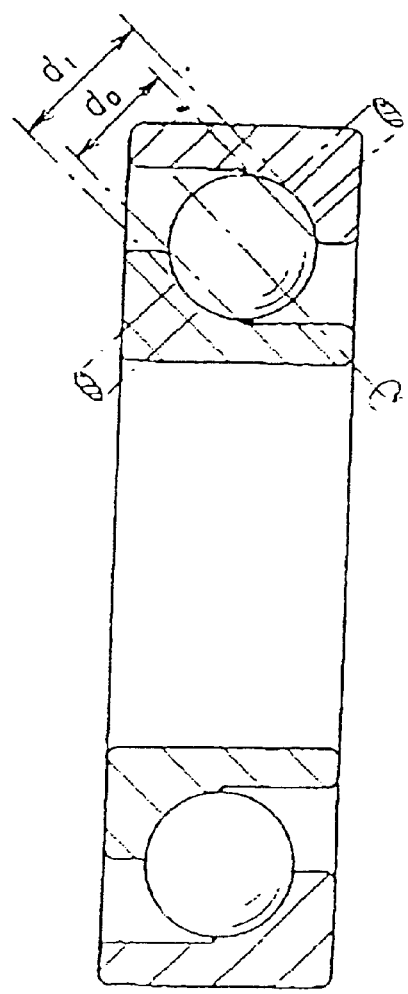

In a case where the rotation shaft of the rolling member 1 inclines largely with respect to a rotational shaft of a track wheel such as shown in FIG. 4, in order to eliminate a difference in peripheral speeds at bilateral portions of the rolling member 1, it is preferred to form the circular rolling portions 2,2 each in a tapered surface shape such as shown in FIG. 2. That is, it is preferred to make a large diameter at one end and small diameter at the other end and give a slope in a longitudinal arcuate shape, and in the shown example, the ratio of the short diameter d with respect to the long diameter is to be 80%.

Such rolling member 1 will be manufactured by forming the circular rolling portion 2 by forcibly deforming the central portion of a spherical ball material (material ball), before performing a quenching (quench hardening) operation to the ball material by means of rolling or like. Through such operation, remaining both end portions are formed as end spherical portions 3,3 as they are. Since the material ball has high dimensional performance and is homogeneous, a homogeneous rolling member 1 can be manufactured with low cost. The circular rolling portion 2 is ground after the quenching in the state that both the end spherical portions 3,3 are supported.

Further, it is not necessary for the circular rolling portion 2 and the end spherical portion 3 to be formed to provide spherical shapes severely in a geometrical meaning and it is allowed therefor to have swelled round shapes. Center holes may be formed to the apex portions of the end spherical portions 3,3 (intersection points of these portions with the central axis X).

Such rolling member 1 has a long contact length of the circular rolling portion 2 in comparison with that of the ball, and accordingly, the load carrying capacity is larger several times than that of ball.

Furthermore, as shown in FIG. 1A, supposing that the contact length of the circular rolling portion 2 of the rolling member 1 is W1, a differential sliding amount (factor) $\pi$ (d−d0) caused by a difference in diameters between the central portion and the end portions of the rolling member is smaller than that $\pi$ (d1−d0) of the ball, which is used as rolling member, so that a friction resistance can be reduced thereby to smoothly move (roll) and a less heat is generated.

Furthermore, since the rolling member 1 of the present invention can be manufactured from the material ball, the manufacturing cost can be also reduced.

Still furthermore, in the case of roller, because the track surface thereof half contacts at an inclined portion thereof, it is required for an object member such as track wheel to have a considerably high working performance and dimensional precision in assembling. However, according to the rolling member 1 of the present invention of the structure mentioned above, the rolling surface 2 has the circular arc shape, so that it attains substantially the same aligning ability as that of the ball used as rolling member, and therefore, the inclination of the track surface of the object member can be absorbed. Thus, it is not required for the object member to have a high working performance and dimensional precision, and hence, it can be easily handled.

For the effective contact length, it is preferred to set it to about ⅔ length of the roller, and according to such setting of the effective contact length, the rolling member 1 attains a better aligning ability and high load capacity such as about four times of that of the ball.

The rolling member 1 may be adopted for various rolling contact apparatus or devices such as linear motion guide apparatus, rolling bearing, uniform motion joint and the like.

Figure 3:
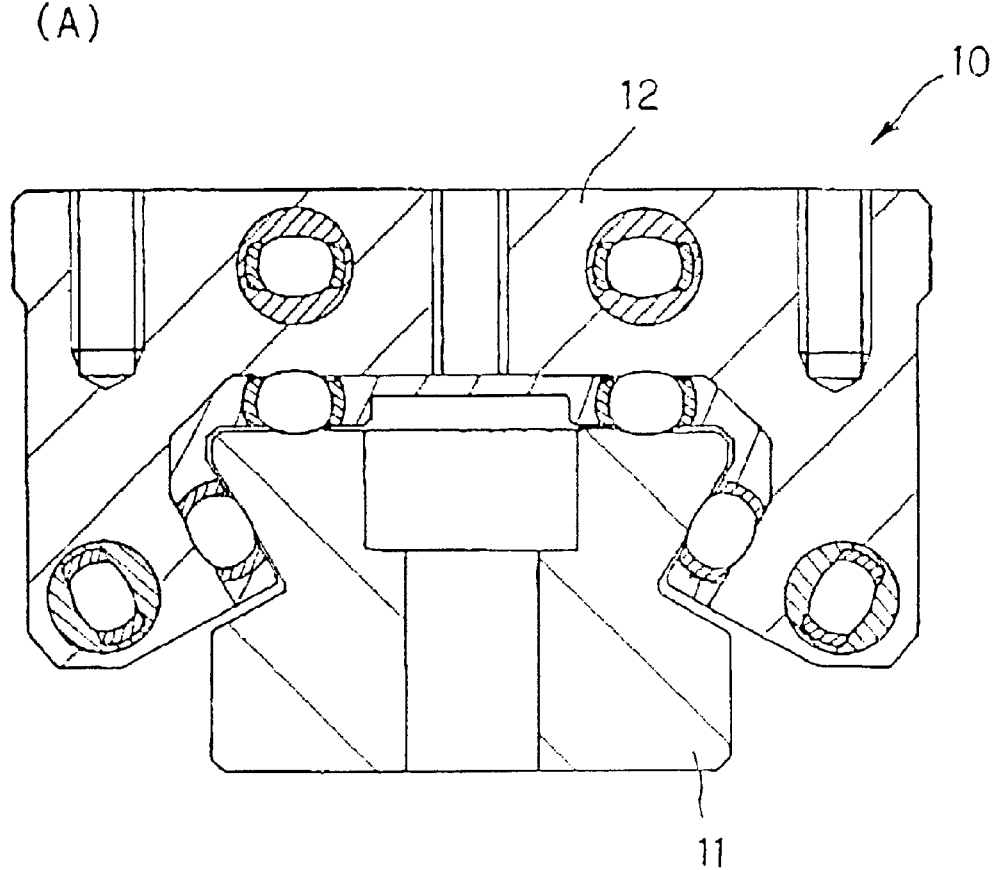
FIG. 3 shows one example of a linear motion guide apparatus to which the rolling member of FIG. 1 is used and includes FIG. 3A being an elevational section thereof and FIG. 3B being a sectional view, in an enlarged scale, of FIG. 3A from which a track rail is removed, FIG. 4 includes FIG. 4A showing an elevational section of one example of a bearing using the rolling member of FIG. 1 and FIG. 4B showing an elevational section of a conventional ball bearing.
Figure 3:
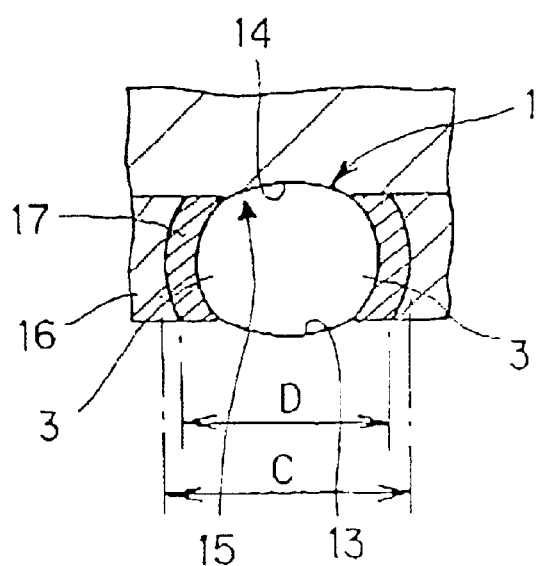

FIG. 3 shows one example of a linear motion guide device 10 to which the rolling member 1 of the above structure is applied. That is, the linear motion guide device 10 comprises a track rail 11 and a movable member 12, as object members to the rolling member 1, which are provided with track surfaces 13 and 14 between which the rolling members 1 are disposed.

With reference to the linear motion guide device 10 of FIG. 3, the circular rolling portions 2,2 are engaged (contacted) with recessed track surfaces 13 and 14 formed respectively to the track rail 11 and the movable member 12, so that bilateral positions of the rolling member 1 can be determined with respect to a track groove 15 as like as a case of the ball, and it is not caused that the rolling member 1 slides bilaterally with respect to the track surface as in a case of the roller and the end surfaces scrape the side wall of the track groove.

Furthermore, when the movable member 12 is dismounted from the track rail 11, hang-down of coupling member coupling the rolling members 1 can be prevented by engaging the bilaterally projecting end spherical portions 3,3 of the rolling member 1 with recessed portion or flanged portion formed to the side wall section 16 of the track groove 15. Further, in a case of no use of the coupling member, the rolling member 1 can be prevented from coming off.

In the example illustrated in FIG. 3, the end spherical portions 3,3 are held by a coupling spherical holding member (retainer) 17 constituting the coupling member. Such coupling spherical holding member 17 is also bilaterally protruded in spherical shape, and the maximum diameter C thereof is made smaller than a width D of an opening of the track groove 15 thereby to engage the end spherical portions 3,3 with the side wall section 16 of the track groove 15 through the coupling spherical holding member 17.

FIG. 4A shows an angular contact type rolling bearing 20 in which the rolling members 1 are disposed between track surfaces 23 and 24 of an outer wheel 21 and an inner wheel 22, respectively, and FIG. 4B shows a conventional rolling bearing for the sake of comparison.

With the angular contact type rolling bearing 20 shown in FIG. 4A, a load in a thrust direction is large and the rolling members 1 roll and move with a state being pressed against the track surfaces 23 and 24, so that a large load carrying capacity is required and it is necessary to consider a countermeasure against heat generation due to the differential sliding motion.

By using the rolling members 1 of the structure of the present invention, however, there can be provided an angular contact type bearing having a high load carrying capacity, as shown in FIG. 1A, a small differential sliding motion and an improved aligning ability. Specifically, by using the rolling member 1 having the tapered surface as shown in FIG. 2, there is no peripheral speed difference, so that the friction resistance can be also reduced as well as small differential sliding motion, and accordingly, such bearing can be effectively utilized as high-speed rotational angular contact bearing.

Furthermore, according to the present invention, it will be preferred to change the ratio of the short diameter of the rolling member 1 to the long diameter thereof in accordance with the contact angle α. For example, in the case of the contact angle α being 15°, 20°, or 30°, it is better to set that ratio to about 90 to 95% and in the case of the contact angle α being 45°, it is better to set that ratio to about 85%.

Figure 5:
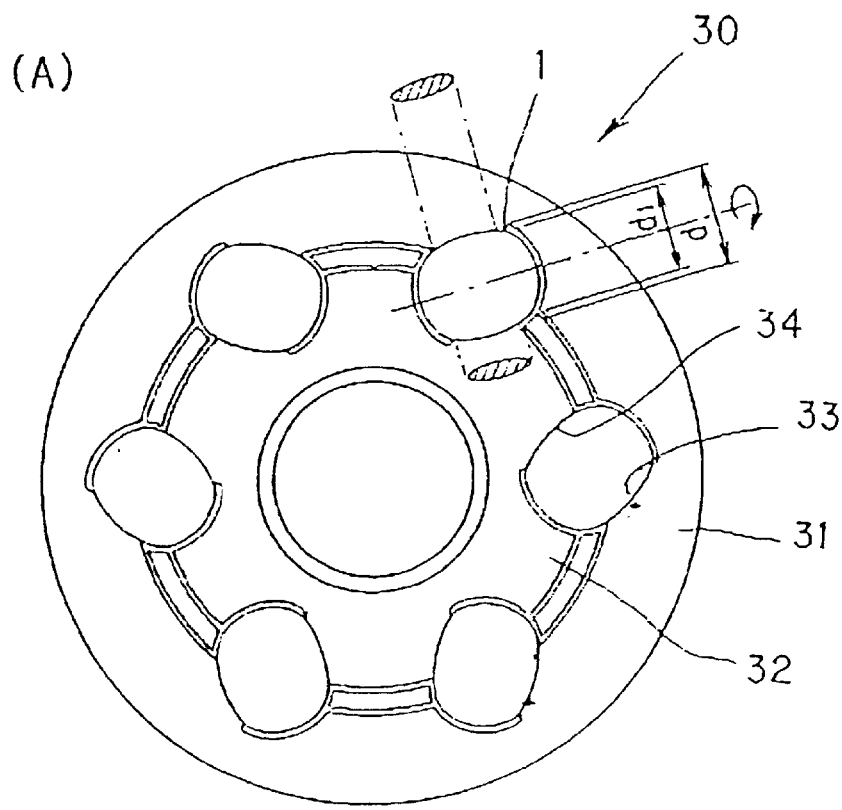
FIG. 5 includes FIG. 5A showing one example of a uniform motion joint using the rolling member of FIG. 1 and FIG. 5B showing a sectional view of one example of a conventional uniform motion joint.
Figure 5:
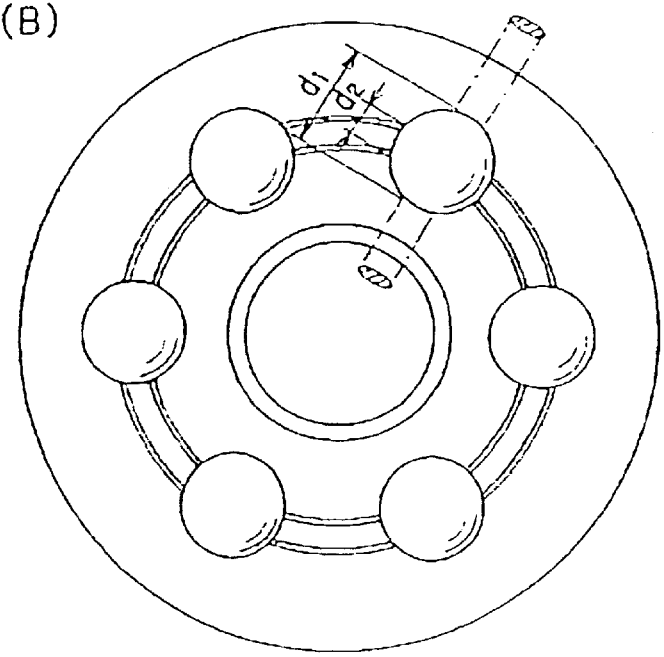

FIG. 5A shows a uniform motion joint 30 in which the rolling members 1 are disposed between track surfaces 33 and 34 of an outer wheel 31 and an inner wheel 32, respectively, and FIG. 5B shows a conventional uniform motion joint for the sake of comparison.

Particularly, with the uniform motion joint 30, the rolling member 1 of the structure of the present invention has a load capacity about four or five times of that of the ball, so that the uniform motion joint 30 can be manufactured with a diameter of the length about ½ to 3/10 of that in the conventional uniform motion joint utilizing the ball and with a weight of about ½ to ¼ thereof, thereby making compact and light weight the structure of the uniform motion joint, and an inertia can be also made small.

Furthermore, the differential sliding motion can be made small as shown in FIG. 1A, so that the smooth rolling motion can be realized with less motion loss and the manufacturing cost can be also reduced.

Still furthermore, by adopting the angular contact structure in which the contacting direction of the respective rolling members 1 are inclined with respect to the radial direction thereof, any backlash can be eliminated and torque can be effectively transferred.

What is claimed is:

1. A rolling member disposed for rotation between blocks which are relatively movable with respect to each other, the rolling member comprising a rolling portion contacting the movable blocks and longitudinal end portions of a spherical shape, wherein the rolling portion has circularly convex surface and is larger in curvature radius than the spherical end portions, and a maximum diameter of the rolling portion falls within a rage of 80±15% of a distance between the spherical end portions.

2. A rolling member according to claim 1, wherein the rolling portion has a large diameter on the side of one of the spherical end portions, and a short diameter on the other side so that the rolling portion has a tapered surface in a longitudinal direction of the rolling member.

3. A rolling member according to claim 1, wherein the rolling portion is formed continuously with the spherical end portions.

4. A rolling member according to claim 3, wherein the continuous portion between the rolling portion and the spherical end portion is formed so as to provide a smooth round shape.

5. A rolling member according to claim 1, wherein the rolling portion is formed by deforming a potion of a material ball, and the spherical end portions are opposing two spherical portions of the material ball which are not subjected to the deforming working.

* * * * *